(12) United States Patent
Park et al.

(10) Patent No.: US 8,199,157 B2
(45) Date of Patent: Jun. 12, 2012

(54) SYSTEM ON CHIP INCLUDING AN IMAGE PROCESSING MEMORY WITH MULTIPLE ACCESS

(75) Inventors: Sun-Hee Park, Gyeonggi-do (KR); Shin-Chan Kang, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 971 days.

(21) Appl. No.: 12/023,916

(22) Filed: Jan. 31, 2008

(65) Prior Publication Data

US 2008/0186321 A1 Aug. 7, 2008

(30) Foreign Application Priority Data

Feb. 6, 2007 (KR) .................. 10-2007-0011895

(51) Int. Cl.
G06F 13/14 (2006.01)
G09G 5/39 (2006.01)
(52) U.S. Cl. .................. 345/519; 345/531; 345/535
(58) Field of Classification Search .................. 345/531, 345/535, 541, 542, 519; 713/320
See application file for complete search history.

(56) References Cited

U.S. PATENT DOCUMENTS

| 6,104,417 | A | * | 8/2000 | Nielsen et al. | ................. | 345/542 |
| 6,288,729 | B1 | * | 9/2001 | Laksono et al. | ............. | 345/520 |
| 6,615,291 | B1 | * | 9/2003 | Kamei et al. | .................... | 710/22 |
| 7,088,371 | B2 | | 8/2006 | Lippincott | | |
| 2006/0152087 | A1 | * | 7/2006 | De Oliverira Kastrup Pereira et al. | .............................. | 307/112 |
| 2006/0190755 | A1 | * | 8/2006 | Kim | .............................. | 713/400 |

FOREIGN PATENT DOCUMENTS

| JP | 2003-18500 | 1/2003 |
| JP | 2005-234687 | 9/2005 |
| KR | 2003-0078386 | 10/2003 |

OTHER PUBLICATIONS

English Patent Publication No. 2005-234687.
English Patent Publication No. 1020030078386.
English Patent Publication No. 2003-018500.

* cited by examiner

Primary Examiner — Jacinta M Crawford
(74) Attorney, Agent, or Firm — F. Chau & Associates, LLC

(57) ABSTRACT

A system on chip (Soc) includes a system bus, a plurality of sub-systems, an image processing logic block, an image memory interface and an image processing memory block. The sub-systems are respectively connected to the system bus. The image processing logic block is connected to the system bus. The image processing logic block performs an image processing. The image processing logic block is included in a first power domain. The image memory interface is connected to the system bus and the image processing logic block. The image processing memory block is connected to the image memory interface. The image processing memory block is used for the image processing. The image memory interface and the image processing memory block are included in a second power domain different from the first power domain.

17 Claims, 5 Drawing Sheets

SYSTEM ON CHIP INCLUDING AN IMAGE PROCESSING MEMORY WITH MULTIPLE ACCESS

CROSS-REFERENCE TO RELATED APPLICATIONS

This application claims priority under 35 USC §119 to Korean Patent Application No. 2007-11895 filed on Feb. 6, 2007 in the Korean Intellectual Property Office (KIPO), the disclosure of which is incorporated herein in its entirety by reference.

BACKGROUND OF THE INVENTION

1. Field of the Invention

The present invention relates to a system on chip, and more particularly to a system on chip including an image processing memory with multiple access.

2. Description of Related Art

Sub-systems in a conventional system on chip may be divided into a plurality of power domains, and the sub-systems in the respective power domains may be powered individually.

FIG. 1 is a block diagram illustrating a conventional system on chip including a plurality of sub-systems.

Referring to FIG. 1, the conventional system on chip includes a plurality of sub-systems. Each of the sub-systems includes a central processing unit (CPU) sub-system 20, an audio sub-system 30, an image sub-system 40, a digital signal processor (DSP) sub-system 50, an input/output (IO) sub-system 60 and a communication sub-system 70. The sub-systems 20, 30, 40, 50, 60 and 70 are respectively connected to a system bus 10. The sub-systems 20, 30, 40, 50, 60 and 70 are divided into power domains according to a function, an operating time, a schedule of the system on chip, etc. A sub-system that is not operated enters a power-down mode to decrease power consumption. The sub-systems 20, 30, 40, 50, 60 and 70 in FIG. 1 may respectively correspond to each power domain.

FIG. 2 is a diagram illustrating a configuration of the image sub-system in the system on chip of FIG. 1.

Referring to FIG. 2, the image sub-system 40 includes an image processing logic 45 and an image processing memory 47. The image processing memory 47 is accessed only through the image processing logic 45. The image processing memory 47 is included in a power domain including the image processing logic 45. The image sub-system 40 enters a power-down mode when the image processing logic 45 does not perform an image processing such as taking a picture, a JPEG coding, etc. The image processing memory 47 is only used for the image processing because the image processing memory 47 also enters a power-down mode when a power-down operation is performed on the image sub-system 40 to enter the power-down mode.

In performing the image processing, a memory size is determined according to a resolution of an image. The image processing is performed by block unit or line unit and memory size may be determined according the unit (block or line). The memory size that is needed to perform the operation with data of block unit or line unit is similar to an internal memory size of another module or a sub-system in the system on chip.

The memory used for the image processing needs 607,168 bits of RAM when an internal memory size is 524,524,288 bits and a DSP needs 786,432 bits of DRAM. That is, the memory size used for the image processing is similar to the internal memory size of module or the sub-system. In the case of conventional system on chip, the image processing memory may not be used when the image processing logic 45 is not operated because the image processing logic 45 and the image processing memory 47 are included in the same power domain.

FIG. 3 is a block diagram illustrating another conventional system on chip including a memory sub-system.

Referring to FIG. 3, the system on chip includes a memory sub-system 80 and a plurality of sub-systems 20, 30, 40, 50 and 70. The memory sub-system 80 includes a data RAM 82, a program ROM 84 and a program RAM 86. The memory sub-system 80 is accessed by the sub-systems 20, 30, 40, 50 and 70 through a system bus 10. An image processing memory may not be used when the image sub-system 40 is in a power-down mode and the system on chip needs to access an external memory (not shown) when a capacity of the sub-system 80 is insufficient. The access to the external memory significantly degrades performance of the system because a path for accessing to the external memory is typically heavily loaded.

Therefore, a need exists for a system on chip including an image processing memory with multiple access.

SUMMARY OF THE INVENTION

In some exemplary embodiments of the present invention, a system on chip (SoC) includes a system bus, a plurality of sub-systems, an image processing logic block, an image memory interface and an image processing memory block. The sub-systems are respectively connected to the system bus. The image processing logic block is connected to the system bus. The image processing logic block performs an image processing. The image processing logic block is included in a first power domain. The image memory interface is connected to the system bus and the image processing logic block. The image processing memory block is connected to the image memory interface. The image processing memory block is used for the image processing. The image memory interface and the image processing memory block are included in a second power domain different from the first power domain.

The sub-systems may be included in respective power domains different from each other and different from the first power domain and the second power domain.

The image memory interface may control paths for accessing the image processing memory block such that a first path has priority to a second path. The first path comprises the system bus and the image processing logic block. The second path comprises the system bus and the image memory interface.

The image memory interface may control the paths for accessing the image processing memory block based on whether the image processing logic block is in a power-down mode.

The image processing memory block may be used as an internal memory when the image processing logic block is in the power-down mode.

The sub-systems may access the image processing memory block through the system bus and the image memory interface when the image processing logic block is in the power power-down mode.

In some exemplary embodiments of the present invention, a system on chip (SoC) includes a plurality of sub-systems, a system bus, an image processing logic block, an image memory interface, an image processing memory block and a power supply unit. Each of the sub-systems includes a monitoring unit for checking an operation state of a corresponding sub-system. The sub-systems are included in respective power domains. The system bus is connected to each of the sub-systems. The image processing logic block is connected to the system bus. The image processing logic block performs an image processing. The image processing logic block is included in a first power domain different from the power domains of the sub-systems. The image memory interface is connected to the system bus and the image processing logic block. The image processing memory block is connected to the image memory interface. The image processing memory block is used for the image processing. The image memory interface and the image processing memory block are included in a second power domain different from the power domains of the sub-systems and different from the first power domain. The power supply unit supplies power to the first power domain, the second power domain and power domains of the sub-systems.

The power domains of the respective sub-systems may be different from each other.

The monitoring unit performs a power-down operation on the corresponding sub-system when the corresponding sub-system is not operated.

The image memory interface may control paths for accessing the image processing memory block such that a first path has priority to a second path. The first path comprises the system bus and the image processing logic block. The second path comprises the system bus and the image memory interface.

The image memory interface may control the paths for accessing the image processing memory block based on whether the image processing logic block is in a power-down mode.

The image processing memory block may be used as an internal memory when the image processing logic block is in the power-down mode.

The sub-systems may access the image processing memory block through the system bus and the image memory interface when the image processing logic block is in the power-down mode.

In some exemplary embodiments of the present invention, a system on chip (SoC) includes a plurality of sub-systems, a system bus, an image processing logic block, an image memory interface, an image processing memory block, a power supply unit and a control unit. Each of the sub-systems includes a monitoring unit for checking an operation state of a corresponding sub-system. The sub-systems are included in respective power domains. The system bus is connected to each of the sub-systems. The image processing logic block is connected to the system bus. The image processing logic block performs an image processing. The image processing logic block is included in a first power domain different from the power domains of the sub-systems. The image memory interface is connected to the system bus and the image processing logic block. The image memory interface checks an operation state of the image processing logic block. The image processing memory block is connected to the image memory interface. The image processing memory block is used for the image processing. The image memory interface and the image processing memory block are included in a second power domain different from the power domains of the sub-systems and different from the first power domain. The power supply unit supplies power to the first power domain, the second power domain and power domains of the sub-systems. The control unit receives operation state information of the sub-systems from each of the monitoring units and receives operation state information of the image processing logic block from the image memory interface to provide a control signal to the power supply unit. The control signal is for performing a power-down operation.

The image memory interface may control paths for accessing the image processing memory block such that a first path has priority to a second path. The first path comprises the system bus and the image processing logic block. The second path comprises the system bus and the image memory interface.

The image memory interface may control the paths for accessing the image processing memory block based on whether the image processing logic block is in a power-down mode.

The image processing memory block may be used as an internal memory when the image processing logic block is in the power-down mode.

The sub-systems may access the image processing memory block through the system bus and the image memory interface when the image processing logic block is in the power-down mode.

The power supply unit may supply power each of the power domains of the sub-systems, the first power domain and the second power domain based on the control signal.

Therefore, the system on chip including image processing memory with multiple access may reduce an operation time by decreasing an incidence of accessing an external memory of the system on chip and a performance of the system is improved by decreasing a load of an external memory controller that is typically in a bottleneck state.

BRIEF DESCRIPTION OF THE DRAWINGS

The present invention will become more apparent by describing detailed exemplary embodiments thereof with reference to the accompanying drawings, in which.

DETAILED DESCRIPTION OF PREFERRED EMBODIMENTS

Figure 1:
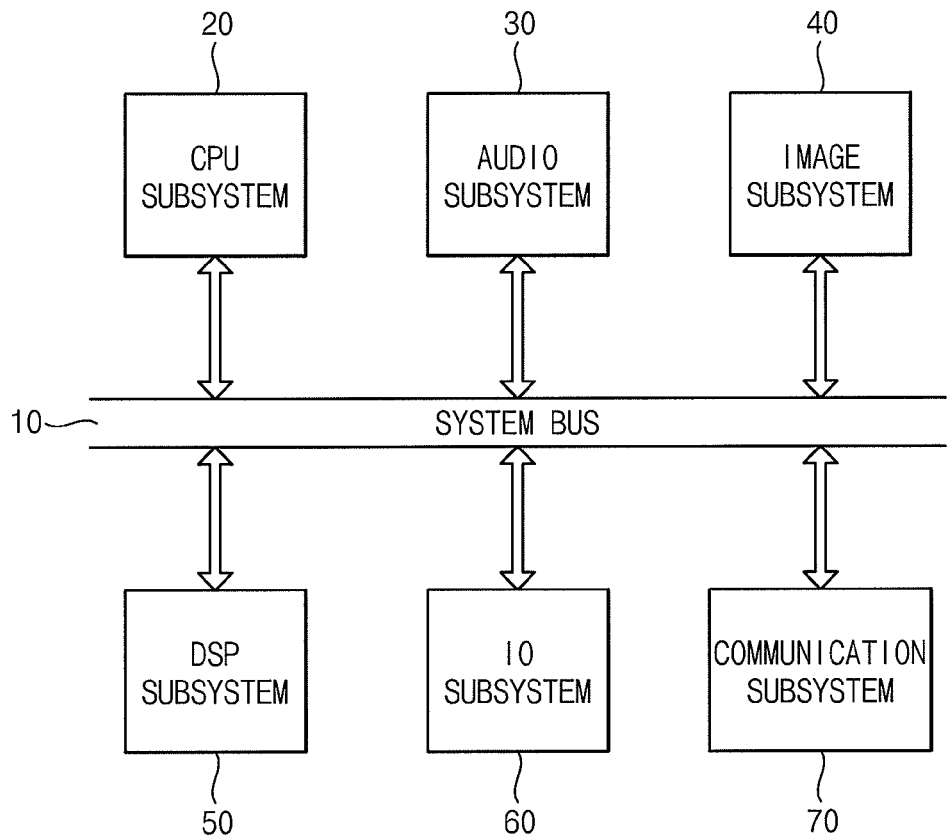
FIG. 1 is a block diagram illustrating a conventional system on chip including a plurality of sub-systems.
Figure 2:
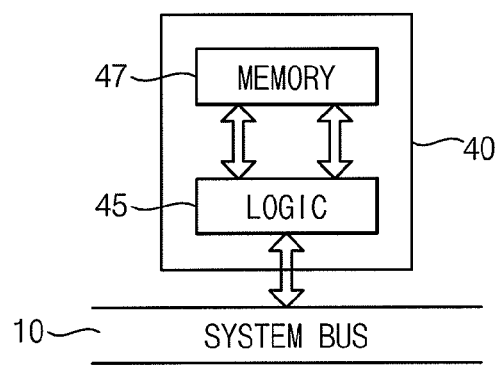
FIG. 2 is a diagram illustrating a configuration of the image sub-system in the system on chip of FIG. 1.
Figure 3:
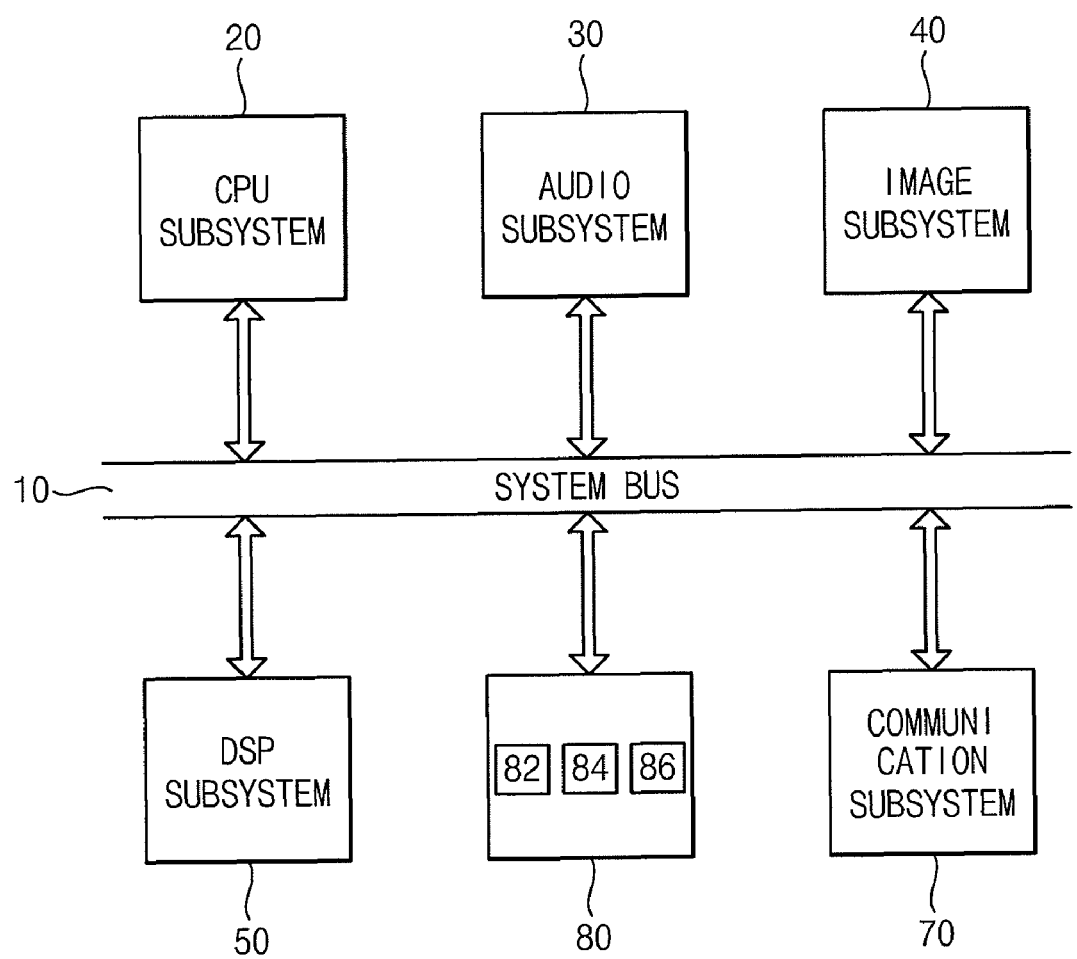
FIG. 3 is a block diagram illustrating another conventional system on chip including a memory sub-system.

Embodiments of the present invention now will be described more fully with reference to the accompanying drawings, in which embodiments of the invention are shown. This invention may, however, be embodied in many different forms and should not be construed as limited to embodiments set forth herein. Rather, embodiments are provided so that this disclosure will be thorough and complete, and will fully convey the scope of the invention to those skilled in the art. Like reference numerals refer to like elements throughout this application.

Figure 4:
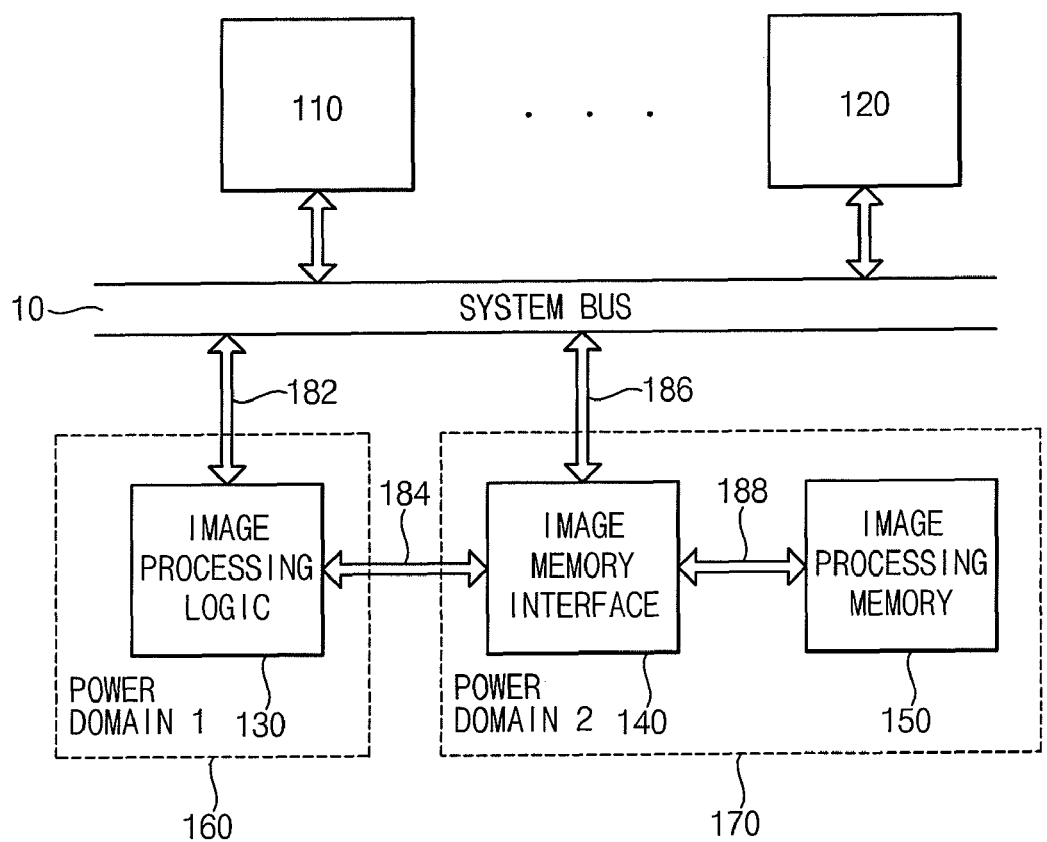
FIG. 4 is a block diagram illustrating a system on chip including an image processing memory with multiple access according to an exemplary embodiment of the present invention.

FIG. 4 is a block diagram illustrating a system on chip including an image processing memory with multiple access according to an exemplary embodiment of the present invention.

Referring to FIG. 4, a system on chip includes a system bus 10, a plurality of sub-systems 110 and 120 connected to the system bus 10, an image processing logic block 130 connected to the system bus 10, an image processing memory block 150 and an image memory interface 140 connected to the system bus 10.

The image processing logic block 130 performs image processing such as image data coding. The image processing memory block 150 is used for an operation of the image processing, and the image memory interface 140 connects the image processing logic block 130 and the image processing memory block 150.

The sub-systems 110 and 120 may be included in different power domains or may be included in the same power domain. The sub-systems 110 and 120 perform corresponding operations. For example, each of the sub-systems 110 and 120 may embody the CPU sub-system 20, the audio sub-system 30, the image sub-system 40, the DSP sub-system 50, the IO sub-system 60 or the communication sub-system 70 of FIG. 1. In the example of FIG. 4, the sub-systems 110 and 120 are included in different power domains.

The system bus 10 connects the sub-systems 110 and 120 with the image processing logic block 130 and the image memory interface 140.

The image processing logic block 130 is included in a first power domain 160 different from the power domains of the sub-systems 110 and 120. The image memory interface 140 and the image processing memory block 150 are included in a second power domain 170 different from the power domains of the sub-systems 110 and 120 and the first power domain 160.

The image memory interface 140 controls a path for accessing the image processing memory block 150. The image processing memory block 150 may be accessed through a path 186 from the system bus 10 or through a path 184 from the image processing logic block 130. The image memory interface 140 controls paths for accessing the image processing memory block 150. For example, a first path comprising the system bus 10, a path 182, the image processing logic block 130, the path 184, the image memory interface 140 and a path 188 has priority to a second path comprising the system bus 10, the path 186, the image memory interface 140 and the path 188. In the above case wherein the first path has priority over the second path, in a normal state, the image processing memory block 150 is accessed from the system bus 10 through the image processing logic block 130.

The image memory interface 140 checks whether the image processing logic block 130 operates normally. The sub-systems 110 and 120 also have a component for checking operations of the sub-systems 110 and 120.

The image memory interface 140 performs a power-down operation on the image processing logic block 130 when the image processing logic block 130 does not perform the image processing. The image processing memory block 150 is not in a power-down mode because the first power domain 160 including the image processing logic block 140 is different from the second power domain 170 including the image memory interface 140 and the image processing memory block 150. The image processing memory block 150 may be used as an internal memory of a system because the image processing memory block 150 is in a power-on state even though the image processing logic block 130 is in the power-down mode. The image processing memory block 150 is accessed from the sub-systems 110 and 120 through the system bus 10 and the image memory interface 140. As described above, a memory capacity of the image processing memory block 150 is sufficiently large to be used as the internal memory of the system.

The image processing memory block 150 is used for processing other than the image processing; the image processing memory block 150 is used as an internal memory of the system when the image processing logic block 130 is in the power-down mode. Therefore, an operation time may be reduced by decreasing an incidence of accessing an external memory of the system on chip. A performance of the system may be improved by decreasing a load of an external memory controller that is typically in a bottleneck state.

Figure 5:
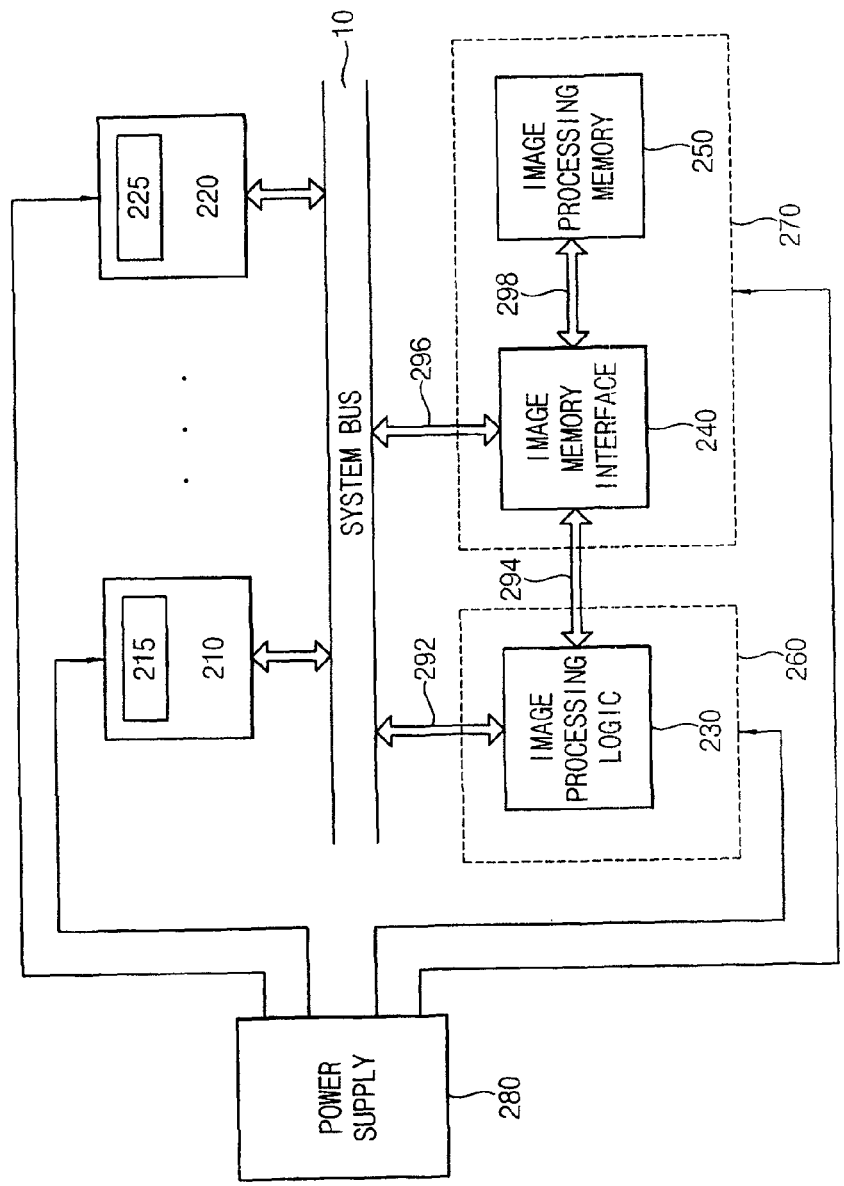
FIG. 5 is a block diagram illustrating a system on chip including an image processing memory with multiple access according to another exemplary embodiment of the present invention.

FIG. 5 is a block diagram illustrating a system on chip including an image processing memory with multiple access according to another exemplary embodiment of the present invention.

Referring to FIG. 5, a system on chip includes a plurality of sub-systems 210 and 220, a system bus 10 connected to each of the sub-systems 210 and 220, an image processing logic block 230, an image memory interface 240, an image processing memory block 250 and a power supply unit 280.

The sub-systems 210 and 220 perform corresponding operations and include monitoring units 215 and 225. The monitoring units 215 and 225 check corresponding sub-systems 210 and 220, and perform a power-down operation on the corresponding sub-systems 210 and 220 when the sub-systems are not operated to decrease power consumption of a system. The sub-systems 210 and 220 are included in power domains different from each other.

The image processing logic block 230 is connected to the system bus 10 and performs an image processing such as image data coding. The image processing memory block 250 is used for an operation of the image processing. The image memory interface 240 connects the image processing logic block 230 and the image processing memory block 250, and the image memory interface 240 is connected to the system bus 10.

The image processing logic block 230 is included in a first power domain 260 different from the power domains of the sub-systems 210 and 220. The image memory interface 240 and the image processing memory block 250 are included in a second power domain 270 different from the power domains of the sub-systems 210 and 220 and the first power domain 260. The power supply unit 280 supplies power to the power domains of the sub-systems 210 and 220, the first power domain 260 and the second power domain 270.

The image memory interface 240 controls paths for accessing the image processing memory block 250. The image processing memory block 250 may be alternatively accessed through a path 296 from the system bus 10 or through a path 294 from the image processing logic block 230. The image memory interface 240 controls the paths for accessing the image processing memory block 250 such that a first path comprising the system bus 10, a path 292, the image processing logic block 230, the path 294, the image memory interface 240 and a path 298 has priority to a second path comprising the system bus 10, the path 296, the image memory interface 240 and the path 298. In the above case wherein the first path has priority over the second path, in a normal state, the image processing memory block 250 is accessed from the system bus 10 through the image processing logic block 230.

The image memory interface 240 checks whether the image processing logic block 230 operates normally.

The image memory interface 240 performs the power-down operation on the image processing logic block 230 when the image processing logic block 230 does not perform the image processing. The image processing memory block 250 is not in a power-down mode because the first power domain 260 including the image processing logic block 230 is different from the second power domain 270 including the image memory interface 240 and the image processing memory block 250. The image processing memory block 250 may be used as an internal memory of a system because the image processing memory block 250 is in a power-on state even though the image processing logic block 230 is in the power-down mode. The image processing memory block 250 is accessed from the sub-systems 210 and 220 through the system bus 10 and the image memory interface 240. As described above, a memory capacity of the image processing memory block 250 is sufficiently large to be used as the internal memory of the system.

The image processing memory block 250 is used for processing other than the image processing; the image processing memory block 250 is used as an internal memory of the system when the image processing logic block 230 is in the power-down mode. Therefore, an operation time may be reduced by decreasing an incidence of accessing an external memory of the system on chip. A performance of the system may be improved by decreasing a load of an external memory controller that is typically in a bottleneck state.

Figure 6:
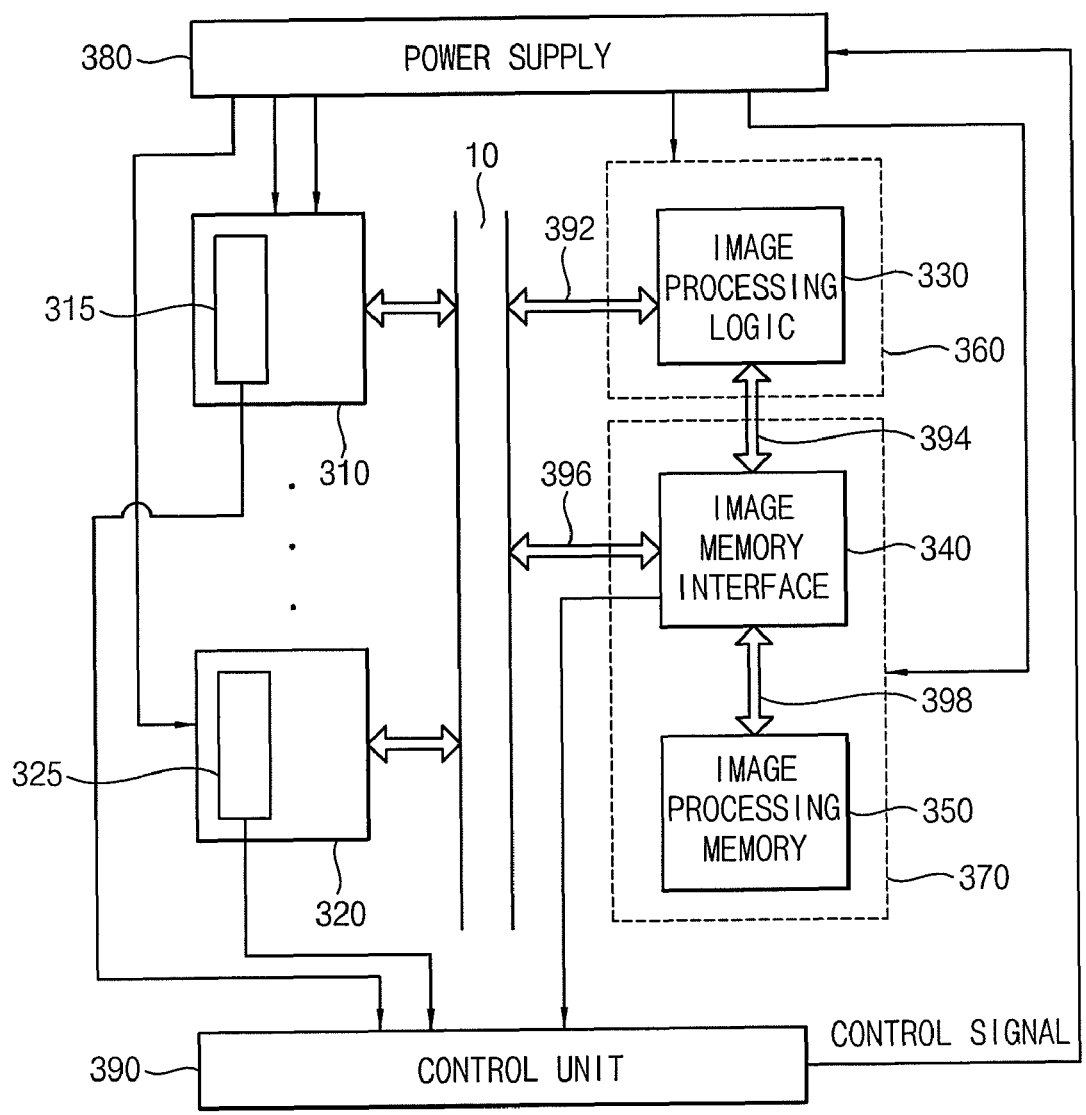
FIG. 6 is a block diagram illustrating a system on chip including an image processing memory with multiple access according to still another exemplary embodiment of the present invention.

FIG. 6 is a block diagram illustrating a system on chip including an image processing memory with multiple access according to still another exemplary embodiment of the present invention.

Referring to FIG. 6, a system on chip includes a plurality of sub-systems 310 and 320, a system bus 10, an image processing logic block 330, an image memory interface 340, an image processing memory block 350, a power supply unit 380 and a control unit 390. The system bus 10 is connected to each of the sub-systems 310 and 320. The image processing logic block 330 is connected to the system bus 10. The image memory interface 340 is connected to the system bus 10 and the image processing logic block 330. The image processing memory block 350 is connected to the image memory interface 340.

The image processing logic block 330 is included in a first power domain 360. The image memory interface 340 and the image processing memory block 350 are included in a second power domain 370 different from the first power domain 360.

The power supply unit 380 supplies power to the power domains of the sub-systems 310 and 320, the first power domain 360 and the second power domain 370.

The sub-systems 310 and 320 include monitoring units 315 and 325. The monitoring units 315 and 325 check operations of corresponding sub-systems 310 and 320 and provide operation information of the sub-systems 310 and 320 to the control unit 390. The sub-systems 310 and 320 are included in power domains different from each other, and the power domains of the sub-systems 310 and 320 are different from the first power domain 360 and the second power domain 370.

The image memory interface 340 controls a path for accessing the image processing memory block 350. The image processing memory block 150 may be accessed through a path 396 from the system bus 10 or through a path 394 from the image processing logic block 330. The image memory interface 340 controls paths for accessing the image processing memory block 350 such that a first path comprising the system bus 10, a path 392, the image processing logic block 330, the path 394, the image memory interface 340 and a path 398 has priority to a second path comprising the system bus 10, the path 396, the image memory interface 340 and the path 398. That is, in a normal state, the image processing memory block 350 is accessed from the system 10 through the image processing logic block 330.

The image memory interface 340 checks whether the image processing logic block 330 operates normally and provides operation information of the image processing logic block 330 to the control unit 390.

The control unit 390 provides a control signal to the power supply unit 380 based on the information received from the monitoring units 315 and 325 and the image memory interface 340. The control signal is a signal for determining whether the power supply unit 380 performs a power-down operation on the sub-systems 310 and 320 and the image processing logic block 330. The power supply unit 380 performs the power-down operation on corresponding sub-systems and the image processing logic block 330, and the power supply unit 380 controls power providing corresponding power domains.

The power supply unit 380 performs the power-down operation on the image processing logic block 330 when the image processing logic block 330 does not perform the image processing. The image processing memory block 350 is not in a power-down mode because the first power domain 360 including the image processing logic block 330 is different from the second power domain 370 including the image memory interface 340 and the image processing memory block 350. The image processing memory block 350 may be used as an internal memory of a system because the image processing memory block 350 is in a power-on state even though the image processing logic block 330 is in the power-down mode. That is, the image processing memory block 350 is accessed from the sub-systems 310 and 320 through the system bus 10 and the image memory interface 340. As described above, a memory capacity of the image processing memory block 350 is sufficiently large to be used as the internal memory of the system.

The image processing memory block 350 is used for processing other than the image processing because the image processing memory block 350 is used as internal memory of the system when the image processing logic block 330 is in the power-down mode. Therefore, an operation time may be reduced by decreasing an incidence of accessing an external memory of the system on chip. A performance of the system may be improved by decreasing a load of an external memory controller that is typically in a bottleneck state.

As described above, a system on chip including image processing memory with multiple access according to an exemplary embodiment of the present invention uses an image processing memory block as an internal memory when an image processing logic block is in a power-down mode, where the image processing logic block is included in a power domain different from a power domain including the image processing memory block. The image processing memory block is used for processing other than the image processing and an operation time may be reduced by decreasing an incidence of accessing to an external memory of the system on chip. A performance of the system may be improved by decreasing a load of an external memory controller that is typically in a bottleneck state.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A system on chip (SoC) comprising:
a system bus;
a plurality of sub-systems respectively connected to the system bus;
an image processing logic block connected to the system bus, the image processing logic block being configured to perform an image processing, the image processing logic block being included in a first power domain;
an image memory interface having a first connection to the system bus and a second connection to the system bus via the image processing logic block;
an image processing memory block connected to the image memory interface, wherein access to the image processing memory block via the first connection or the second connection is controlled by the image memory interface, the image processing memory block being configured to be used for the image processing, the image memory interface and the image processing memory block being included in a second power domain different from the first power domain; and
a control unit configured to receive operation state information of the image processing logic block from the image memory interface for controlling a power supply unit configured to supply power to the first power domain and the second power domain.

2. The SoC of claim 1, wherein the sub-systems are included in respective power domains different from each other and different from the first power domain and the second power domain.

3. The SoC of claim 1, wherein the image memory interface controls paths for accessing the image processing memory block such that a first path has priority to a second path, the first path comprising the system bus, the second connection, the image memory interface and the image processing logic block, the second path comprising the system bus, the first connection, and the image memory interface.

4. The SoC of claim 3, wherein the image memory interface controls the paths for accessing the image processing memory block based on whether the image processing logic block is in a power-down mode.

5. The SoC of claim 4, wherein the image processing memory block is used as an internal memory when the image processing logic block is in the power-down mode.

6. The SoC of claim 4, wherein the sub-systems access the image processing memory block through the system bus and the image memory interface when the image processing logic block is in the power-down mode.

7. A system on chip (SoC) comprising:
a plurality of sub-systems, each of the sub-systems including a monitoring unit for checking an operation state of a corresponding sub-system, the sub-systems included in respective power domains;
a system bus connected to each of the sub-systems;
an image processing logic block connected to the system bus, the image processing logic block being configured to perform an image processing, the image processing logic block being included in a first power domain different from the power domains of the sub-systems;
an image memory interface connected to the system bus and the image processing logic block;
an image processing memory block connected to the image memory interface, the image processing memory block being configured to be used for the image processing, the image memory interface and the image processing memory block being included in a second power domain different from the power domains of the sub-systems and different from the first power domain; and
a control unit configured to receive operation state information of the image processing logic block from the image memory interface for controlling a power supply unit configured to supply power to the first power domain, the second power domain and power domains of the sub-systems,
wherein the image memory interface controls paths for accessing the image processing memory block such that a first path has priority to a second path, the first path comprising the system bus, the image memory interface and the image processing logic block, the second path comprising the system bus and the image memory interface and excluding the image processing logic block.

8. The SoC of claim 7, wherein the power domains of the respective sub-systems are different from each other.

9. The SoC of claim 8, wherein the monitoring unit performs a power-down operation on the corresponding sub-system when the corresponding sub-system is not operated.

10. The SoC of claim 7, wherein the image memory interface controls the paths for accessing the image processing memory block based on whether the image processing logic block is in a power-down mode.

11. The SoC of claim 10, wherein the image processing memory block is used as an internal memory when the image processing logic block is in the power-down mode.

12. The SoC of claim 10, wherein the sub-systems access the image processing memory block through the system bus and the image memory interface when the image processing logic block is in the power-down mode.

13. A system on chip (SoC) comprising:
a plurality of sub-systems, each of the sub-systems including a monitoring unit for checking an operation state of a corresponding sub-system, the sub-systems included in respective power domains;
a system bus connected to each of the sub-systems;
an image processing logic block connected to the system bus, the image processing logic block being configured to perform an image processing, the image processing logic block being included in a first power domain different from the power domains of the sub-systems;
an image memory interface connected to the system bus and the image processing logic block, the image memory interface for checking an operation state of the image processing logic block;
an image processing memory block connected to the image memory interface, the image processing memory block being configured to be used for the image processing, the image memory interface and the image processing memory block being included in a second power domain different from the power domains of the sub-systems and different from the first power domain;
a power supply unit configured to supply power to the first power domain, the second power domain and power domains of the sub-systems; and
a control unit configured to receive operation state information of the sub-systems from each of the monitoring units and receive operation state information of the image processing logic block from the image memory interface to provide a control signal to the power supply unit, the control signal being for performing a power-down operation,
wherein the image memory interface controls paths for accessing the image processing memory block such that a first path has priority to a second path, the first path comprising the system bus, the image memory interface and the image processing logic block, the second path comprising the system bus and the image memory interface and excluding the image processing logic block.

14. The SoC of claim 13, wherein the image memory interface controls the paths for accessing the image processing memory block based on whether the image processing logic block is in a power-down mode.

15. The SoC of claim 14, wherein the image processing memory block is used as an internal memory when the image processing logic block is in the power-down mode.

16. The SoC of claim 14, wherein the sub-systems access the image processing memory block through the system bus and the image memory interface when the image processing logic block is in the power-down mode.

17. The SoC of claim 13, wherein the power supply unit supplies power to each of the power domains of the sub-systems, the first power domain and the second power domain based on the control signal.

* * * * *